(12) United States Patent
Lazzaro et al.

(10) Patent No.: US 9,704,353 B2
(45) Date of Patent: *Jul. 11, 2017

(54) DYNAMIC PIN PAD FOR CREDIT/DEBIT/OTHER ELECTRONIC TRANSACTIONS

(75) Inventors: John R. Lazzaro, Mentor, OH (US); Michael A. Keresman, III, Kirtland Hills, OH (US); Chandra Balasubramanian, Mentor-on-the-Lake, OH (US); Francis M. Sherwin, Mentor, OH (US)

(73) Assignee: CardinalCommerce Corporation, Mentor, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/195,408

(22) Filed: Aug. 1, 2011

(65) Prior Publication Data

US 2011/0288965 A1 Nov. 24, 2011

Related U.S. Application Data

(63) Continuation of application No. 10/358,583, filed on Feb. 5, 2003, now Pat. No. 7,992,007.

(Continued)

(51) Int. Cl.
*G07F 19/00* (2006.01)
*G06Q 30/06* (2012.01)
*G07F 7/10* (2006.01)

(52) U.S. Cl.
CPC ....... *G07F 19/201* (2013.01); *G06Q 30/0641* (2013.01); *G07F 7/10* (2013.01); *G07F 7/1041* (2013.01)

(58) Field of Classification Search
CPC .................................................... G07F 19/201

(Continued)

(56) References Cited

U.S. PATENT DOCUMENTS 5,949,348 A * 9/1999 Kapp et al. ............... 340/5.4
6,209,104 B1 * 3/2001 Jalili ............................ 726/18

(Continued)

FOREIGN PATENT DOCUMENTS

WO WO 0118719 3/2001
WO WO 0118720 3/2001

OTHER PUBLICATIONS

White, Ron, "How Computers Work", Millennium Ed., Que Corporation, Indianapolis, IN, 1999.*

(Continued)

*Primary Examiner* — Jacob C. Coppola
(74) *Attorney, Agent, or Firm* — Fay Sharpe LLP

(57) ABSTRACT

A method is provided for authenticating debit card transactions engaged in by a cardholder on a communications network. The method includes: a) establishing a connection over the network with a client being used by the cardholder to engage in a transaction on the network; b) providing over the connection to the client a web page containing a keypad (22) having a plurality of buttons (24) that collectively define a geometry of the keypad (22), the keypad (22) being employed by the cardholder to enter a PIN via selection of the buttons (24) with a pointing device of the client; c) obtaining over the connection the PIN enter by the cardholder; d) determining if the obtained PIN is correct for a debit card being used by the cardholder to engage in the transaction; e) repeating step a) through d) for each transaction the cardholder engages in on the network; and, f) with respect to two transactions engaged in by the cardholder, changing at least one of a location of the keypad (22) on the web page, the geometry of the keypad (22), a size of the buttons (24) and a spacing between neighboring buttons (24).

11 Claims, 7 Drawing Sheets

Related U.S. Application Data

(60) Provisional application No. 60/354,553, filed on Feb. 5, 2002.

(58) Field of Classification Search
USPC .......................................................... 705/75
See application file for complete search history.

(56) References Cited

U.S. PATENT DOCUMENTS

| | | | |
|---|---|---|---|
| 6,381,654 B1 * | 4/2002 | Brawn et al. | 719/331 |
| 6,434,702 B1 | 8/2002 | Maddalozzo, Jr. et al. | |
| 6,445,694 B1 * | 9/2002 | Swartz | 370/352 |
| 6,549,194 B1 | 4/2003 | McIntyre et al. | |
| 6,718,471 B1 | 4/2004 | Kashima | |
| 6,720,860 B1 * | 4/2004 | Narayanaswami | 340/5.54 |
| 7,296,233 B2 * | 11/2007 | Tan | G06F 3/04886 715/741 |
| 7,705,829 B1 * | 4/2010 | Plotnikov | G06F 3/0236 341/22 |
| 2002/0124172 A1 * | 9/2002 | Manahan | 713/176 |
| 2002/0175940 A1 * | 11/2002 | Lection et al. | 345/764 |
| 2003/0191947 A1 * | 10/2003 | Stubblefield et al. | 713/183 |
| 2004/0073813 A1 * | 4/2004 | Pinkas et al. | 713/202 |

OTHER PUBLICATIONS

Gralla, Preston, How the Internet Works, 1999, Que Publishing, Millenium Ed., all pages.*

* cited by examiner

DYNAMIC PIN PAD FOR CREDIT/DEBIT/OTHER ELECTRONIC TRANSACTIONS

This application is a continuation of application of U.S. patent application Ser. No. 10/358,583, filed Feb. 5, 2003, now U.S. Pat. No. 7,992,007 which claims the benefit of U.S. Provisional Application No. 60/354,553, filed Feb. 5, 2002, both of which are incorporated herein by reference in their entirety.

FIELD

The present invention relates to Internet security. It finds particular application in conjunction with the use and protection of a secret personal identification number (PIN) used in an e-commerce debit transaction and will be described with particular reference thereto. However, it is to be appreciated that the present invention is also amenable to other like applications.

BACKGROUND

Internet commerce, or e-commerce as it is otherwise known, relates to the buying and selling of products and services by consumers and merchants over the Internet or other like transactional exchanges of information. The convenience of shopping over the Internet has sparked considerable interest in e-commerce on behalf of both consumers and merchants. Internet sales, or like transactions, have been typically carried out using standard credit cards such as Visa®, MasterCard®, Discover®, American Express®, or the like, or standard debit cards, i.e., check cards or automated teller machine (ATM) cards which directly access funds from an associated deposit account or other bank account.

While widely used for more traditional face-to-face transactions, use of these standard cards in connection with e-commerce presents certain difficulties, including difficulties concerning authentication or positive identification of the cardholder. For example, maintaining consumer confidence and security has become difficult with increased reports of fraud. The resulting apprehension is also fueled by consumer uncertainty of the reputation or integrity of a merchant with whom the consumer is dealing. The security of the consumer's card information or other personal information typically submitted along with a traditional e-commerce transaction (e.g., address, card number, phone number, etc.) serves to increase apprehension even more. Additionally, cardholders, merchants and financial institutions are all concerned about safeguarding against fraudulent or otherwise unauthorized transactions.

In particular, transactions involving debit cards (i.e., ATM or check cards) generally employ what is known as the PIN to verify the authenticity of the person using the debit card. The PIN is secret number or code known by the card's authorized user(s) but not generally known by others. The use of the otherwise secret PIN in conjunction with debit card transactions provides security against those who may have obtained the card number or Personal Account Number (PAN) without authorization, e.g., through unscrupulous or other means. Typically, the PAN alone (i.e., without the PIN) cannot be used to complete a transaction. That is to say, the debit card typically cannot be used unless the PIN number is also entered for the transaction. In this regard, the PIN number becomes important to providing security against theft or unauthorized charges against the cardholder's account.

Recently, attempts have been made to integrate the ability to use debit cards on web sites for purchasing goods and/or services over the Internet. This typically involves a transaction similar to a standard e-commerce transaction carried out with a credit card; however, the difference, as stated above, is that a debit card transaction also employs the cardholder's PIN in order to complete the transaction. Entry and/or use of the PAN and/or the PIN over an open network (such as the Internet) exposes both to potential security breaches.

For example, the secrecy of PIN codes can be compromised by "spy" software that is able to track a user's "movements" on-line. Generally speaking, spy software allows a third party to unknowingly eavesdrop on a user's Internet session and "watch" the web sites which are visited by the user. The unsuspecting user is often not be aware of the unauthorized third party, which can also observe the user conduct e-commerce transactions. By doing so, the third party is able to view and/or capture PANs, PINs and other information entered by the user. There have been various efforts devoted to thwarting such eavesdropping. One technique, for example, is to have entered keystrokes appear on the screen as asterisks or other indistinguishable characters; however, certain types of spy software can still detect keystrokes even though asterisks are used to disguise the appearance of entered PIN digits or other secret codes.

To address the problem of keystroke monitoring, another technique developed employs a graphical user interface (GUI) and has PAN and PIN numbers entered in a virtual alphanumeric keypad by the use of a mouse or other pointing device. With reference to FIG. 1, a traditionally used keypad 12 is shown on a display device 10. For example, in an e-commerce environment, this virtual keypad may be on a web page presented to a cardholder for entry of their PIN. That is to say, a designated server may provide the web page over a communications network to a client running a suitable browser when the transaction reaches the point where the cardholder operating the client is to enter their PIN. Optionally, the steps of entering the PIN are displayed in authentication window 16 during the debit transaction. Commonly, each button 14 within the keypad is arranged as a traditional keypad, with no variance therefrom.

The GUI method avoids the problem of someone monitoring keystrokes that are entered by the user. However, sophisticated spy software is also able to track mouse movements and scrolling in order to determine the location of interaction between the cursor, the clicking of the mouse and the content of the web page. Accordingly, by monitoring these activities, patterns can be discerned which may divulge a cardholder's PIN. That is to say, a series of consecutive mouse clicks which reoccur from transaction to transaction at or near the same relative locations can be correlated with the traditional keypad configuration shown in FIG. 1 to determine the PIN being entered.

Accordingly, it would be advantageous to have measures, devices and/or techniques which protect the PAN and/or the PIN, and in particular, which guard the secrecy of the PIN. More specifically, it is desired to have a method for carrying out secured debit card transactions, and, also, generally, any transaction employing a credit or debit card authorization over the Internet or other communications network.

The present invention contemplates a new and improved dynamic PIN pad which overcomes the above-referenced problems and others.

SUMMARY

In accordance with one aspect of the present invention, a method is provided for authenticating debit card transactions engaged in by a cardholder on a communications network. The method includes: a) establishing a connection over the network with a client being used by the cardholder to engage in a transaction on the network; b) providing over the connection to the client a web page containing a keypad having a plurality of buttons that collectively define a geometry of the keypad, the keypad being employed by the cardholder to enter a PIN via selection of the buttons with a pointing device of the client; c) obtaining over the connection the PIN enter by the cardholder; d) determining if the obtained PIN is correct for a debit card being used by the cardholder to engage in the transaction; e) repeating step a) through d) for each transaction the cardholder engages in on the network; and, f) with respect to two transactions engaged in by the cardholder, changing at least one of a location of the keypad on the web page, the geometry of the keypad, a size of the buttons and a spacing between neighboring buttons.

In accordance with a more particular aspect of the present invention, the method further includes authenticating the transaction if it is determined that the obtained PIN is correct, and not authenticating the transaction if it is determined that the obtained PIN in not correct.

In accordance with another aspect of the present invention, a method of obtaining a secret code from a user includes providing to the user a keypad having a plurality of buttons that collectively define a geometry of the keypad. The keypad is employed by the user to enter the secret code via selection of the buttons. The method also includes intermittently changing at least one of a location of the keypad, the geometry of the keypad, a size of the buttons and a spacing between neighboring buttons.

In accordance with a more particular aspect of the present invention, the keypad appears on a GUI presented to the user for entry of the secret code.

In accordance with a more particular aspect of the present invention, the method further includes transmitting a web page over a communications network to the user, said web page acting as the GUI.

In accordance with a more particular aspect of the present invention, the method further includes obtaining over the communications network the secret code enter by the user.

In accordance with a more particular aspect of the present invention, the method further includes repeatedly providing the keypad to the user each time the secret code is to be obtained. The changing is carried out between each time the keypad is provided.

In accordance with a more particular aspect of the present invention, the secret code is a PIN for a debit card.

In accordance with a more particular aspect of the present invention, the method further includes assigning values to the buttons such that the keypad exhibits an ordered sequential progression of values.

In accordance with a more particular aspect of the present invention, after the changing the keypad continues to exhibit an ordered sequential progression of values.

In accordance with another aspect of the present invention, a dynamically changing keypad for obtaining a secret code includes a plurality of buttons that collectively define a geometry of the keypad. The keypad is employed to enter the secret code via selection of the buttons, and means are provided for intermittently changing at least one of a location of the keypad, the geometry of the keypad, a size of the buttons and a spacing between neighboring buttons.

In accordance with a more particular aspect of the present invention, the keypad is implemented on a GUI presented for entry of the secret code, the keypad appearing on a display of the GUI.

In accordance with a more particular aspect of the present invention, a web page transmitted over a communications network defines the appearance of the keypad on the GUI's display.

In accordance with a more particular aspect of the present invention, the secret code is a PIN for a debit card, the PIN being collected by the web page over the communications network.

In accordance with a more particular aspect of the present invention, the buttons have values assigned thereto such that the keypad exhibits an ordered sequential progression of values.

In accordance with a more particular aspect of the present invention, after said keypad changes, it continues to exhibit an ordered sequential progression of values.

In accordance with a more particular aspect of the present invention, the keypad changes after each time the secret code is entered therein.

In accordance with another aspect of the present invention, a GUI is provided for entering a secret code. The GUI includes a display, and a keypad appearing on the display. The keypad includes a plurality of buttons that collectively define a geometry of the keypad, and is employed to enter the secret code via selection of the buttons. The GUI is intermittently varied such that at least one of, a location of the keypad within the GUI, the geometry of the keypad, a size of the buttons and a spacing between neighboring buttons, is changed each time the GUI is varied.

In accordance with a more particular aspect of the present invention, the GUI further includes a web page which defines an appearance of the GUI. The web page is transmitted over a communications network to a client including the display such that the GUI is presented by the client for entry of the secret code.

One advantage of the present invention is that exposure of a consumer's PIN over a communications network is reduced or eliminated.

Another advantage of the present invention is that keypad buttons may retain an ordered sequential pattern of values for ease in locating a desired value within the keypad.

Still further advantages and benefits of the present invention will become apparent to those of ordinary skill in the art upon reading and understanding this specification.

BRIEF DESCRIPTION OF THE DRAWINGS

The present invention may take form in various components and arrangements of components, and/or in various steps and arrangements of steps. The drawings are only for purposes of illustrating preferred embodiments and are not to be construed as limiting the invention.

DETAILED DESCRIPTION OF PREFERRED EMBODIMENTS

Figure 1:
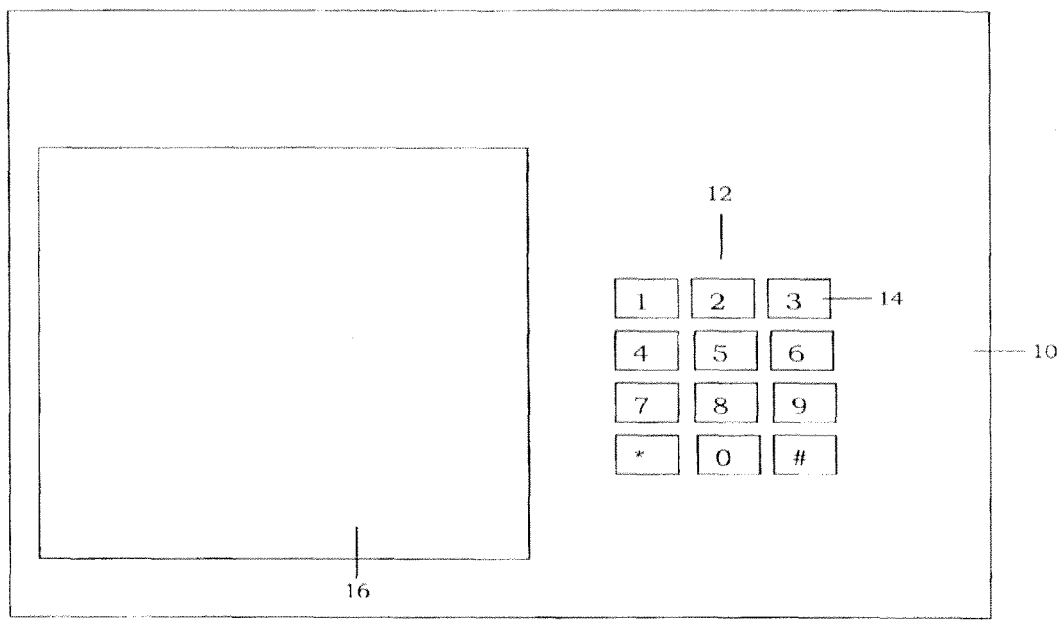
FIG. 1 illustrates a typical representation of a virtual keypad.
Figure 2:
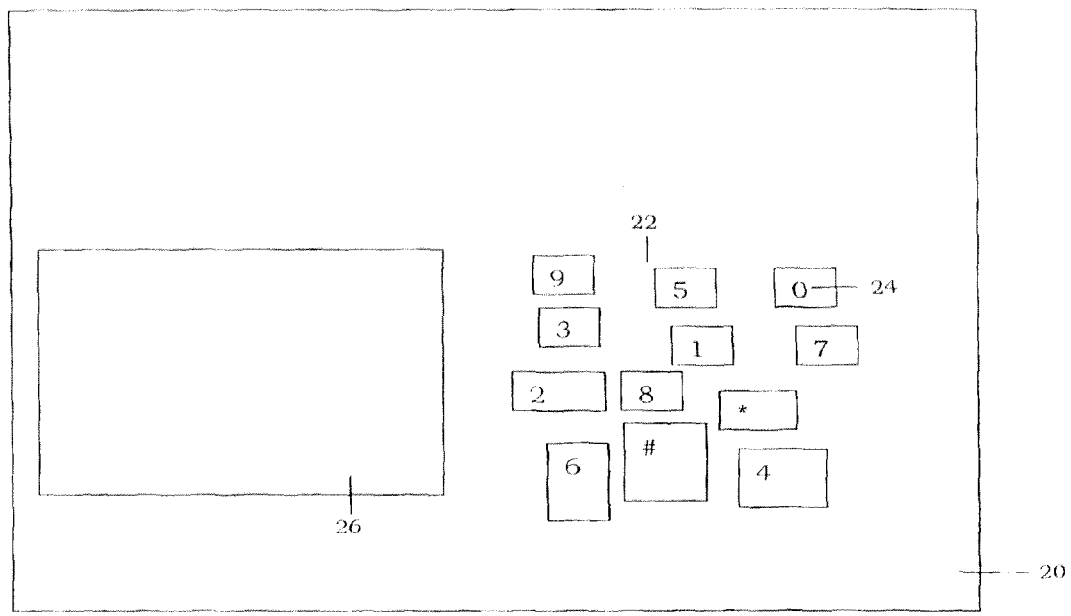
FIG. 2 illustrates an exemplary layout for a dynamically changing GUI in accordance with aspects of the present invention.
Figure 3:
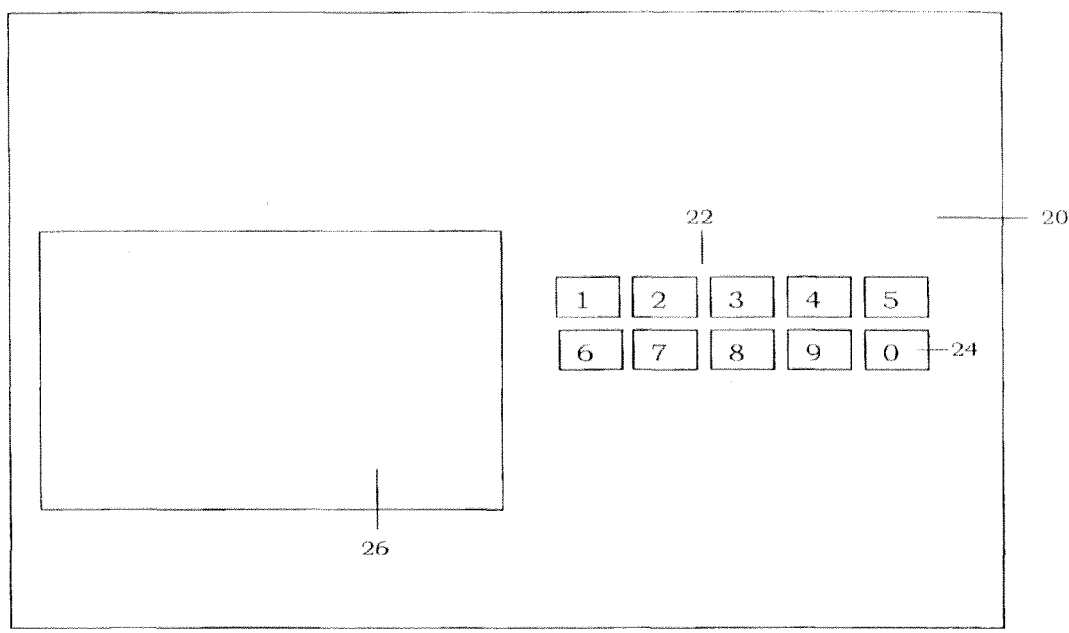
FIG. 3 illustrates another exemplary layout for the dynamically changing GUI in accordance with aspects of the present invention.
Figure 4:
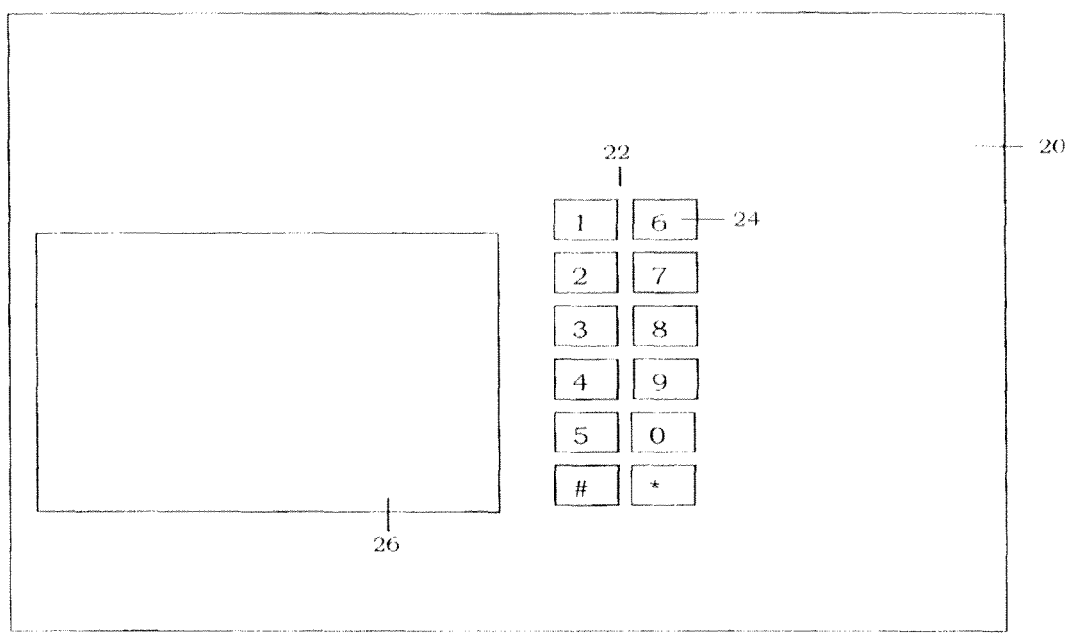
FIG. 4 illustrates still another exemplary layout for the dynamically changing GUI in accordance with aspects of the present invention.
Figure 5:
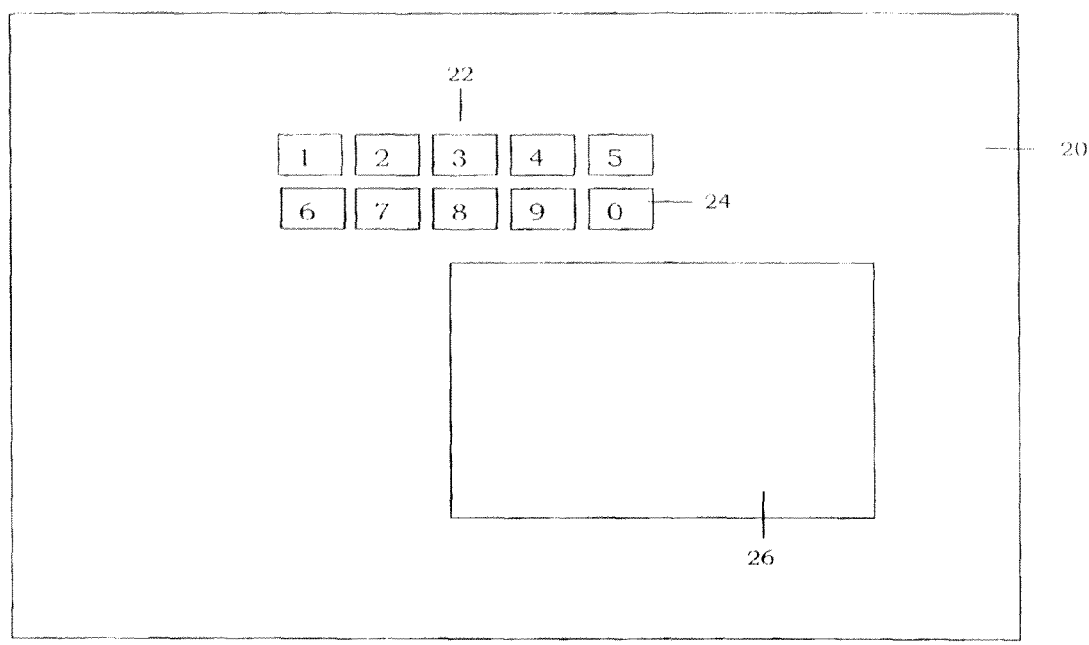
FIG. 5 illustrates another exemplary layout for the dynamically changing GUI in accordance with aspects of the present invention.
Figure 6:
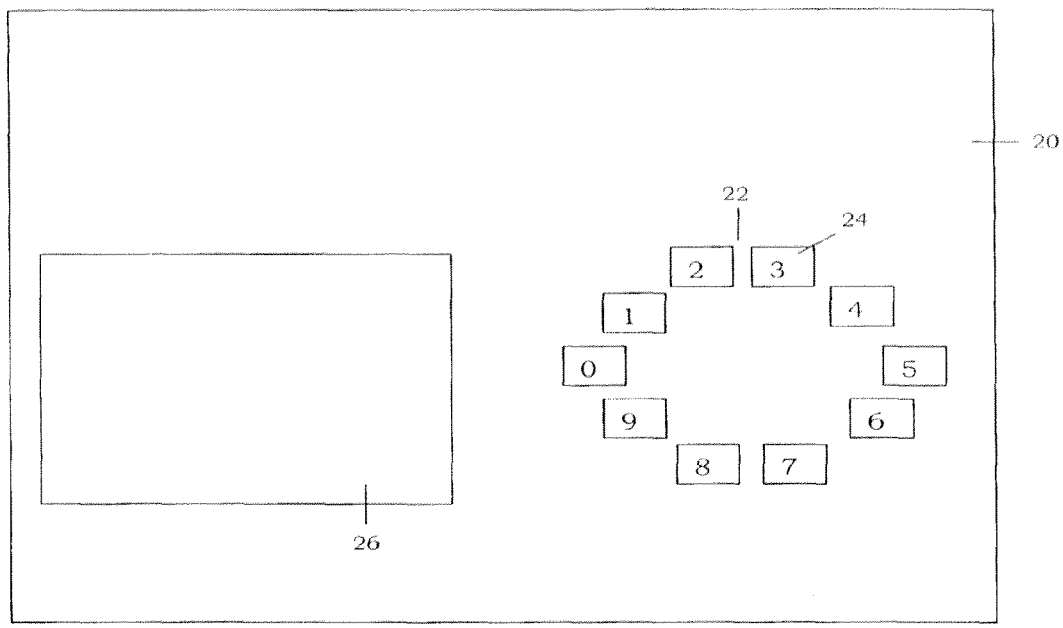
FIG. 6 illustrates yet another exemplary layout for the dynamically changing GUI in accordance with aspects of the present invention.
Figure 7:
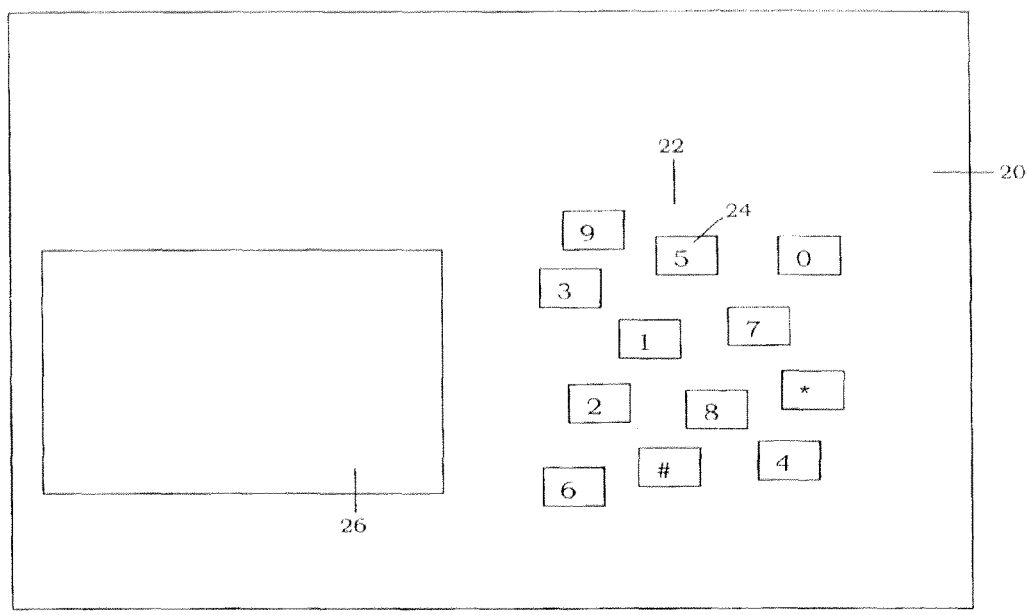
FIG. 7 illustrates another exemplary layout for the dynamically changing GUI in accordance with aspects of the present invention.

With reference to FIGS. 2-7, a GUI 20 is employed to enter data in connection with a transaction carried out over a data communications network, such as the Internet. The transaction may be, for example, a credit or debit card transaction in which a secret PIN or other confidential data is to be entered and transmitted from a client to a server via the network. By the use of a mouse or other pointing device, the secret PIN or other confidential data is entered using a virtual alphanumeric keypad 22 represented on the GUI 20. The keypad 22 optionally includes twelve (12) icons or virtual buttons 24 (e.g., numbers 0-9, '*' and '#' as shown in FIGS. 2, 4 and 7). However, the keypad 22 may contain more buttons 24 or less buttons 24 (e.g., as shown in FIGS. 3, 5 and 6), and each button 24 may having one or more alphanumeric characters or other symbols assigned thereto. Suitably, the buttons 24 on keypad 22 have alphanumeric key assignments similar to those usually found on an ATM or telephone keypad. Alternately, different alphanumeric characters or other symbols may be assigned to the buttons 24.

The client at which the user entering the PIN is stationed includes a monitor or display on which the GUI 20 is presented. Suitably, the client is a computer running an appropriate browser or another similar web-enabled device, and it receives a web page over the network from the server to which the PIN is being transmitted. The web page defines the appearance and/or representation of the GUI 20. That is to say, the server provides the web page over the communications network to the client running the browser when the transaction reaches the point where the cardholder operating the client is to enter their PIN. The entered PIN is then collect via the web page acting as the GUI 20.

As shown, the steps for entering the PIN or other instructions, options, queries and/or other relevant information, etc. are displayed in window 26 during the transaction. In this manner, the GUI 20 appears similar to an ATM terminal. This familiar appearance reduces any potential user confusion and/or eases possible anxiety.

To complete a transaction, the user enters the requested data via the keypad 22 using an appropriate pointer. For example, in the case of a debit card transaction, the user may enter the card's associated PAN, expiration date and PIN on the keypad 22. The entered data is transmitted over the network to the requesting server where it is cross-referenced to a database to verify the user's identity and/or authenticate the transaction. Suitably, the database is maintained by the institution operating the server, e.g., the issuer of the card being used in the transaction or some contracted authenticating party. The database contains the relevant PANs along with their associated PINs. The obtained PIN is checked to see if it matches the PIN on file in the database for the given PAN. In this manner, if there is a match (i.e., the PIN entered/obtained is correct), then the transaction is authenticated, otherwise the transaction is not authenticated.

Periodically, the appearance of the GUI 20 or web page provided for collecting the PIN is changed so that repetitive patterns in the relative locations of mouse clicks or the like cannot be readily discerned and/or related to a particular layout. That is to say, from time-to-time the layout of elements displayed on the GUI 20 change. For example, as the different FIGS. 2-7 show, the changes preferably include varying any one or more of the following: the relative locations of buttons 24 with respect to one another; the spacing between neighboring buttons 24; the sizes of buttons 24; the relative locations of the window 26 and the keypad 22 with respect to one another; the arrangement of the buttons 24 within the keypad 22 (e.g., in rows and columns, circular, scattered, etc.); and, the number of rows and/or columns in the keypad 22. Additionally, the selected assignment of alphanumeric characters and/or symbols to the buttons 24 may also optionally be changed. Suitably, for a given user or cardholder, the appearance changes between each transaction or network session, or optionally, at some other desired interval.

Suitably, the overall appearance and/or any one or more of the aforementioned characteristics effecting the same may be randomly generated, e.g., by the server providing the web page, or alternately, by external systems (e.g., computer systems or other random number generating devices). Each of the aforementioned characteristics of the appearance may optionally be based upon a randomly selected number or other randomly generated factor. That is to say, e.g., the spacing between neighboring buttons 24 may be determined by generating a first random number which then becomes the spacing, while the arrangement of the buttons 24 is determined by generating a second random number which identifies a particular arrangement, etc. Optionally, the overall appearance and/or any one or more of the characteristics may cycle or otherwise advance through predetermined settings in a selected or random order. For example, the GUI's appearance may cycle through the layouts shown in FIGS. 2-7, changing layouts between each transaction in some selected, predetermine, random or quasi-random fashion.

It is to be appreciated, that the PIN may be obtained or otherwise received in a number ways once entered. In one suitable embodiment, the values of selected buttons 24 are returned over the communications network. Alternately, the locations of mouse clicks or the like on the GUI 20 or web page may be captured and returned over the communications network, e.g., as X-Y coordinates or other positional data. In the latter case, the appearance of the GUI 20 or web page is retained or otherwise known by its provider so that the positional data can be associated with the button values corresponding thereto. Optionally, the GUI's appearance or the web page itself and/or information associated with its generation (e.g., sufficient enough to reproduce the appearance) is retained or otherwise known by the provider thereof.

In this manner, a method is provided for securely conducting a PIN-based transaction over the Internet or other open network. The transaction may include, for example, any form of money transfer or payment related to business-to-business (B2B), business-to-consumer (B2C), peer-to-peer (P2P) or government related transactions. While transacting, the cardholder is prompted by the service provider (e.g., the card issuer or some other third party authenticator) to enter their PAN, PIN and optionally the expiration of the card for the purpose of validating and authenticating the user. However, when entered using the dynamically changing GUI 20, patterns of mouse clicks and the like are not always the same even though the PIN or other data being entered remains unchanged. Accordingly, a repetitive pattern for PIN entry does not develop which could otherwise be linked to a traditional keypad layout to uncover the PIN.

In a suitable embodiment, an ActiveX or Java plug-in is employed for implementation. However, it is to be appreciated that implementation may also take the form of any appropriate software, hardware, firmware or some combination thereof. Security is further enhanced by encrypting the data before transmitting it over the network to the receiving server using a secure socket layer (SSL). For example, the PIN (and if desired the PAN) can be encrypted using public/private key pairs as are known in the art. The distribution of a public key to clients is optionally embedded in and/or transmitted with the web page defining the GUI 20, and the private key is stored at a suitable location. The public/private key pair is used to generate a session key employed to carry out the desired encryption. To further strengthen security the public/private key pair is also changed periodically.

The PAN and/or expiration date are not usually strictly secret in the same manner as the PIN. Accordingly, the cardholder may be presented with a first web page that is provided by the server, which prompts them to enter their PAN and select the appropriate expiration date. The PAN and expiration data are transmitted to the server and validated. Upon successful validation (i.e., it is a legitimate PAN having the enter expiration data), the cardholder is then provided with the aforementioned GUI 20 (e.g., via a second separate web page) for entering their PIN. The user inputs their PIN using the button icons 24 of the keypad 22 and the PIN is transmitted over the network to the server for authentication. By separating the PAN entry and transmission from PIN entry and transmission, the likelihood of an unauthorized third party intercepting and correlating both pieces of information is reduced.

Optionally, in order to conduct an e-commerce transaction using a debit or credit card, the consumer initially proceeds through the same process as per a standard e-commerce credit card transaction. Namely, the consumer may choose selected goods or services from a merchant's web page and place them into a virtual shopping cart or the like. When he is done shopping, the consumer continues to a check-out process where pertinent information as to the consumer's billing and shipping information can be entered. The consumer may also enter information concerning the card or account. Such information may include the type of card (Visa®, MasterCard®, Discover®, American Express®, or the like), the consumer's name as listed on the card, the card number, any security codes listed on the card and/or the expiration date of the card. For a debit card transaction, in addition to the above information, the consumer would also enter a PIN using the dynamically changing GUI 20 in order to complete the transaction.

In one suitable embodiment, the buttons 24 are assigned a standard set of alphanumeric values (e.g., like an ATM or telephone keypad) for each transaction such that the values assigned to the buttons 24 remain in sequential order for their relative positions in the keypad 22, e.g., as shown in FIGS. 3-6. Accordingly, a user can readily locate the button 24 having the value that is desired to be entered. However, the arrangement of the keypad 22, the locations of the keypad 22 and the window 26 relative to one another and/or the number of rows and/or columns in the keypad 22 change periodically. In this manner, the repeated observation of a series of mouse clicks in the same pattern of relative locations is thwarted. Similarly, the buttons 24 may continue to be sequentially valued and the spacing between neighboring buttons 24 may changed from transaction to transaction. Again, both the aforementioned advantages are thus realized. Of course at times, the buttons 24 and their values can be in a standard keypad configuration so long as the layout changes periodically, e.g., from transaction to transaction.

In alternate embodiments, the individual button location and size is varied or changed from session to session. Additionally, the assignment of values to the buttons 24 may be random or otherwise non-sequential (e.g., see FIGS. 2 and 7). In particular, with reference to FIG. 2, the numbering of the buttons 24 within the keypad 22 is scrambled and the size and spacing between the buttons is varied.

The various layouts shown in FIGS. 2-7 are merely exemplary and are not to be construed as limiting. Again, in accordance with a preferred embodiment, PIN secrecy is guarded by changing, from session to session, any number of layout characteristics that ultimately effect the appearance of the GUI 20, thereby changing the locations of mouse clicks or the like which are used to enter a PIN or other data on the keypad 22. This may include changing: the vertical and/or horizontal size of, the authentication window 26, keypad 22 and/or buttons 24, individually or in any combination. Alternatively, or in conjunction therewith, the vertical and/or horizontal location of: the window 26, keypad 22 and/or buttons 24, individually or in any combination, can be changed from session to session in order to alter the appearance. As a result, the absolute position of a given button 24 and the relative distance between neighboring buttons 24 and the relative locations of the buttons 24 change with each transaction. This, coupled with the somewhat random nature of clicking on a button 24 (i.e., the precise location of a click on a button 24 changes from click to click), significantly obstructs conventional mouse tracking. Dynamically changing the PIN entry keypad or GUI 20 in this manner exponentially increases security. Mouse movement capture programs typically track the X-Y coordinate of the clicks, and by dynamically changing the GUI 20 or PIN collection web page each time it is presented (i.e., for each session), a conventional mouse capture program will not be able to ascertain which number or value was clicked or entered.

With particular reference to FIG. 6, an exemplary GUI layout is shown. As shown, the keypad 22 is arranged in a non-traditional manner in order to avoid tracking of mouse movement. It is contemplated that not only are the buttons 24 within the keypad 22 arranged in a circular configuration, but the numbers may be arranged in a random order and/or the buttons 24 may be of different/varying sizes and/or different/varying spacing. Another exemplary GUI layout is shown in FIG. 7. In this embodiment, the keypad 22 is not arranged in any particular order, but rather is sporadic scattered in the same general area. The buttons 24 are also numbered in a random fashion. It is also contemplated that the buttons 24 could be of varying size and/or the location of the window 26 can be dynamically repositioned. Thus, the GUI layout changes from session to session such that a wide array of variations are presented in a random or quasi-random or otherwise substantially undeterminable order. Again, optionally, one or more of the following are changed from session to session: button numbering; button pattern and/or spacing; button location and/or size; keypad location and/or size and/or the authentication window location.

An advantage of having varying locations of the keypad buttons 24 is that the numbering or assignment of selected values thereto can still be maintained in an organized fashion if desired. For example, in FIG. 3, the numbering of the buttons 24 has a left-to-right sequential two-row organization, while in FIG. 4 the numbering of the buttons 24 has a top-to-bottom sequential two-column organization. The logically organized arrangement of both avoids errors in manual entry in a keypad that the consumer may otherwise not be familiar with. However, changing between the layouts of FIGS. 3 and 4 still provides security against spy software by providing a varying location of the buttons 24. While the spy software may be able to track mouse movements, by invoking a dynamically changing layout as described herein, those mouse movements will be impractical if not impossible to correlate with particular numbers.

Of course, additional security measures can be taken in conjunction with the measures described herein for securely conducting e-commerce transactions using a debit or credit card. For example, consumer education via messaging to consumers through the window 26 or otherwise can direct the consumer to view the provider's server certificate. If the name on the certificate does not match that of the service provider, the consumer is instructed to terminate the transaction and report the incident. Additionally, providers can recognize certain merchants, initially merchant acceptance can be limited to a few select merchants, which hinder attempts by unauthorized third parties and hackers to create bogus merchants. Further security measures include a merchant portal listing of all approved merchants with links to their web sites to avoid the risk presented by bogus merchants.

Another optional security measure to be used is to implement global Internet scanning. To detect hackers who are presenting bogus merchants and GUIs, global Internet scanning services offered by Internet security firms can be utilized. The global Internet scanning services will search for specific parameters provided for the search, monitor traffic patterns to detect abnormal access activities, scan for familiar domain names, and so on. This approach provides a security measure to prevent or track any website presenting a similar looking GUI application that is unauthorized. Further, the service provider can also register a combination of domain names similar to the one used for presenting the GUI 20. This counter measure also acts as a potential deterrent against hack attempts that use similar domain names to confuse consumers into engaging in an e-commerce transaction.

Yet another optional security measure is the use of access devices that can recognize authenticated parties. The consumer access device, which can be a personal computer, personal digital assistant, mobile phone, etc., preferably has the ability to recognize participating business, government agencies, financial institutions, merchants, etc., based on a unique secret identifier known only between the consumer access device and the participating entity. The unique secret identifier can take the form, for example, of an EMBED Tag within the participating entity's web page. If a non-participating entity attempts to impersonate a valid participant, software on the consumer access device is able to recognize the impersonation and display a message to the user to terminate the transaction.

For purposes of the present application, the terms "consumer", "cardholder" and "user" will at times be used interchangeably. Similarly, the term "PIN" specifically denotes a personal identification number for a debit card, however, more generally, it may be used to refer to any like code or alphanumeric string, the identity of which is desired to be kept secret or confidential. Additionally, the arrangement or configuration of the keypad is defined by the relative positions of the buttons themselves irrespective of their assigned values. That is to say, the arrangement or configuration of the keypad refers to its collective geometry, including its overall size and/or shape.

The invention has been described with reference to the preferred embodiments. Obviously, modifications and alterations will occur to others upon a reading and understanding of this specification. It is intended that the invention be construed as including all such modifications and alterations insofar as they come within the scope of the appended claims or the equivalents thereof.

What is claimed is:

1. A computer-implemented method of obtaining a secret code from a user, said method comprising:
dynamically generating, by at least one computer, a keypad consisting of a plurality of rectangular buttons that collectively define a geometry of the keypad, including randomly selecting a size or a shape for each of said plurality of rectangular buttons;
presenting, by the at least one computer, to the user a graphical user interface (GUI) comprising the dynamically generated keypad for entry of the secret code and a window displaying the steps for entering the secret code, options for the user, queries for the user, or instructions for the user, wherein the plurality of rectangular buttons are displayed concurrently;
intermittently changing, by the at least one computer, a layout of the window and the keypad by at least changing a size of the window and relative location of the keypad on the GUI with respect to the window;
intermittently regenerating, by the at least one computer, the dynamically generated keypad, wherein at least one of a size of at least one of the rectangular buttons and a spacing between at least two neighboring rectangular buttons is changed by randomly selecting the size of at least one of the rectangular buttons or randomly selecting the spacing between at least two neighboring rectangular buttons;
capturing, by the at least one computer, the locations of rectangular buttons selected by the user as X-Y coordinates on a grid; and
obtaining, by the at least one computer, the locations of the rectangular buttons entered by the user.

2. The method of claim 1, wherein the intermittently regenerating the dynamically generated keypad includes changing at least one of a size of the dynamically generated keypad.

3. The method according to claim 1, further comprising:
transmitting a web page over a communications network to the user, said web page acting as the GUI.

4. The method according to claim 1, further comprising:
repeatedly providing the keypad to the user each time the secret code is to be obtained, said changing being carried out between each time the keypad is provided.

5. The method according to claim 4, wherein the secret code is a personal identification number (PIN) for a debit card.

6. The method according to claim 1, further comprising:
assigning values to the buttons such that the keypad exhibits an ordered sequential progression of values.

7. The method according to claim 6, wherein after the changing said keypad continues to exhibit an ordered sequential progression of values.

8. A device for receiving a secret code, said device comprising:
a display device; and,
at least one processor programmed to:

dynamically generate a keypad, said keypad including a plurality of rectangular buttons that collectively define a geometry of the keypad, including randomly selecting a size or a shape for each of said plurality of rectangular buttons;

output a graphical user interface (GUI) on the display device, said GUI including the dynamically generated keypad for entry of the secret code and a window displaying the steps for entering the secret code, options for a user, queries for the user, or instructions for the user, wherein the plurality of buttons are displayed concurrently;

intermittently change a layout of the window and the keypad by at least changing a size of the window and relative location of the keypad on the GUI with respect to the window;

intermittently regenerate the dynamically generated keypad such that at least one of (a) a size of at least one of the rectangular buttons and (b) a spacing between at least two neighboring rectangular buttons is changed by randomly selecting the size of at least one of the rectangular buttons or randomly selecting the spacing between at least two neighboring rectangular buttons;

capture the locations of rectangular buttons selected by the user as X-Y coordinates on a grid; and obtain the locations of the rectangular buttons entered by the user.

9. The device of claim 8, further comprising:

a web page which defines an appearance of the GUI, said web page being transmitted over a communications network to a client including the display such that the GUI is presented by the client for entry of the secret code.

10. The device of claim 8, wherein the plurality of rectangular buttons include at least two neighboring buttons having a first spacing therebetween and at least two neighboring rectangular buttons having a second spacing therebetween, said second spacing being different from said first spacing.

11. A non-transitory computer readable media including thereon a program that when executed by a processor carries out a method comprising:

dynamically generating, by at least one computer, a keypad consisting of a plurality of rectangular buttons that collectively define a geometry of the keypad, including randomly selecting a size or a shape for each of said plurality of rectangular buttons;

presenting, by the at least one computer, to the user a graphical user interface (GUI) comprising the dynamically generated keypad for entry of the secret code and a window displaying the steps for entering the secret code, options for the user, queries for the user, or instructions for the user, wherein the plurality of rectangular buttons are displayed concurrently;

intermittently changing, by the at least one computer, a layout of the window and the keypad by at least changing a size of the window and relative location of the keypad on the GUI with respect to the window;

intermittently regenerating, by the at least one computer, the dynamically generated keypad, wherein at least one of a size of at least one of the rectangular buttons and a spacing between at least two neighboring rectangular buttons is changed by randomly selecting the size of at least one of the rectangular buttons or randomly selecting the spacing between at least two neighboring rectangular buttons;

capturing, by the at least one computer, the locations of rectangular buttons selected by the user as X-Y coordinates on a grid; and obtaining, by the at least one computer, the locations of the rectangular buttons entered by the user.

* * * * *